US010542152B2

(12) United States Patent
Liang

(10) Patent No.: US 10,542,152 B2
(45) Date of Patent: *Jan. 21, 2020

(54) ECHO TIME DELAY DETECTION METHOD, ECHO ELIMINATION CHIP, AND TERMINAL EQUIPMENT

(71) Applicant: TENCENT TECHNOLOGY (SHENZHEN) COMPANY LIMITED, Shenzhen, Guangdong (CN)

(72) Inventor: Jun Bin Liang, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/426,546

(22) Filed: May 30, 2019

(65) Prior Publication Data

US 2019/0281162 A1  Sep. 12, 2019

Related U.S. Application Data

(63) Continuation of application No. 15/761,694, filed as application No. PCT/CN2017/077266 on Mar. 20, 2017, now Pat. No. 10,356,249.

(30) Foreign Application Priority Data

Mar. 21, 2016   (CN) .......................... 2016 1 0162686

(51) Int. Cl.
*H04M 9/08* (2006.01)
*H04M 9/10* (2006.01)
(Continued)

(52) U.S. Cl.
CPC .......... *H04M 9/08* (2013.01); *G10L 21/0208* (2013.01); *G10L 21/0232* (2013.01); *H04M 9/10* (2013.01);
(Continued)

(58) Field of Classification Search
CPC ......... H04M 9/082; H04M 3/002; H04M 9/08
See application file for complete search history.

(56) References Cited

U.S. PATENT DOCUMENTS 6,766,021 B2     7/2004  Kurtz et al.
2006/0072484 A1*  4/2006  Qi ........................... H04B 3/23
                                                    370/286

(Continued)

FOREIGN PATENT DOCUMENTS

CN   101026659 A    8/2007
CN   101163178 A    4/2008
(Continued)

OTHER PUBLICATIONS

International Search Report of PCT/CN2017/077266 dated Jun. 9, 2017.

(Continued)

*Primary Examiner* — Dung Hong
(74) *Attorney, Agent, or Firm* — Sughrue Mion, PLLC

(57) ABSTRACT

An echo time delay detection method, an echo elimination device, and terminal equipment are provided. The echo time delay detection method includes: obtaining an audio signal transmitted through air and acquired by an audio input device of terminal equipment when detecting a call access request, the audio signal corresponding to an audio output by an audio output device of the terminal equipment; converting the audio signal to obtain a signal to be processed; determining a reference signal corresponding to the audio signal; and determining an echo time delay value according to the reference signal and the signal to be processed.

21 Claims, 6 Drawing Sheets

(51) Int. Cl.
*G10L 21/0232* (2013.01)
*G10L 21/0208* (2013.01)
*H04B 17/336* (2015.01)

(52) U.S. Cl.
CPC .. *G10L 2021/02082* (2013.01); *H04B 17/336* (2015.01)

(56) References Cited

U.S. PATENT DOCUMENTS

| | | | |
|---|---|---|---|
| 2007/0025482 A1* | 2/2007 | Wells | G10L 21/04 375/355 |
| 2007/0092074 A1* | 4/2007 | Takada | H04B 3/23 379/406.08 |
| 2008/0140767 A1 | 6/2008 | Rao et al. | |
| 2008/0247535 A1* | 10/2008 | Li | H04M 9/082 379/406.08 |
| 2008/0253553 A1* | 10/2008 | Li | H04M 9/082 379/406.05 |
| 2014/0270149 A1* | 9/2014 | Xu | H04M 9/082 379/406.08 |
| 2014/0357325 A1* | 12/2014 | Ahgren | H04M 9/082 455/570 |
| 2014/0357326 A1* | 12/2014 | Ahgren | H04M 9/082 455/570 |
| 2016/0127527 A1* | 5/2016 | Mani | G10L 21/0216 379/388.07 |
| 2016/0127561 A1* | 5/2016 | Mani | H04M 9/08 379/406.08 |
| 2016/0134759 A1* | 5/2016 | Mani | H04M 9/082 379/406.08 |
| 2016/0171988 A1* | 6/2016 | Vos | G10L 21/0205 704/226 |

FOREIGN PATENT DOCUMENTS

| | | |
|---|---|---|
| CN | 101321201 A | 12/2008 |
| CN | 102625006 A | 8/2012 |
| CN | 104778950 A | 7/2015 |
| CN | 104902116 A | 9/2015 |
| CN | 105847611 A | 8/2016 |

OTHER PUBLICATIONS

Communication dated Dec. 4, 2018 issued by the State Intellectual Property Office of People's Republic of China in counterpart application No. 201610162686.3.

Communication dated Jul. 3, 2019, from The China National Intellectual Property Administration in counterpart Application No. 201610162686.3.

Communication dated Nov. 8, 2019, from The Korean Intellectual Property Office in Application No. 10-2018-7009673.

* cited by examiner

ECHO TIME DELAY DETECTION METHOD, ECHO ELIMINATION CHIP, AND TERMINAL EQUIPMENT

CROSS-REFERENCE TO RELATED APPLICATIONS

This application is a continuation application of U.S. patent application Ser. No. 15/761,694, which is a U.S. national stage application under 35 USC 371 of International Application, PCT/CN2017/077266, filed on Mar. 20, 2017 in the Chinese Patent Office, which claims priority to Chinese Patent Application No. 201610162686.3, entitled "ECHO TIME DELAY DETECTION METHOD, ECHO ELIMINATION CHIP, AND TERMINAL EQUIPMENT", filed on Mar. 21, 2016, in the Chinese Patent Office, the disclosures of which are incorporated by reference in their entireties.

BACKGROUND

1. Field

The exemplary embodiments relate to the technical field of audios, and specifically, to an echo time delay detection method, an echo elimination chip, an echo elimination device, and terminal equipment.

2. Description of Related Art

An echo is generated when an audio played by a speaker of terminal equipment is re-acquired by a microphone of the terminal equipment in a call process of the terminal equipment. The microphone of the terminal equipment acquires an audio of a terminal user (or a user of the terminal equipment) in the call process and transmits the audio to a counterpart. When there is an echo, the echo is transmitted together with the audio of the terminal user to the counterpart, so that the counterpart hears the echo and the audio of the terminal user at the same time. Thus, the echo in the call process severely reduces the quality of the call, and it is desirable to eliminate the echo generated in the call process in order to improve the quality of the call.

Echo elimination indicates eliminating, based on an audio signal played by the speaker of the terminal equipment, an echo signal acquired by the microphone of the terminal equipment and corresponding to the audio signal. To accurately perform echo elimination, it is needed to determine an echo time delay between playing of the audio signal by the speaker and re-acquisition of the audio signal by the microphone. Therefore, detection of the echo time delay is important for echo elimination.

However, in the related art, the echo time delay detection method is mainly performed in a call process. A period of time is needed for echo time delay detection based on a call speed signal after a call starts, which results in that terminal equipment is incapable of performing echo elimination on the call speech signal within the period of time for echo time delay detection, and therefore the probability of receiving an echo by a counterpart of the call is extremely high, and that the quality of the call becomes relatively poor.

SUMMARY

One or more exemplary embodiments provide an echo time delay detection method, an echo elimination chip, an echo elimination device, and terminal equipment, that may detect an echo time delay before starting of a call of the terminal equipment, and timely and accurately perform echo elimination in a call process.

An aspect of an exemplary embodiment provides an echo time delay detection method, including:

obtaining an audio signal transmitted through air and acquired by an audio input device of terminal equipment when detecting a call access request, the audio signal corresponding to an audio output by an audio output device of the terminal equipment;

converting the audio signal to obtain a signal to be processed;

determining a reference signal corresponding to the audio signal;

determining a binary array, comprising binary values of all frequency bins, of each frame of the reference signal and a binary array, comprising binary values of all frequency bins, of each frame of the signal to be processed; and determining a first echo time delay value based on binary arrays of respective frames of the reference signal and the signal to be processed.

An aspect of an exemplary embodiment provides an echo elimination device, including: at least one memory operable to store program code; and at least one processor operable to read the program code, and operate as instructed by the program code. The program code including:

obtaining code configured to cause the at least one processor to obtain an audio signal transmitted through air and acquired by an audio input device of terminal equipment when detecting a call access request, the audio signal corresponding to an audio output by an audio output device of the terminal equipment;

conversion code configured to cause the at least one processor to convert the audio signal to obtain a signal to be processed;

first determination code configured to cause the at least one processor to determine a reference signal corresponding to the audio signal:

second determination code configured to cause the at least one processor to determine a binary array, including binary values of all frequency bins, of each frame of the reference signal and a binary array, including binary values of all frequency bins, of each frame of the signal to be processed; and third determination code configured to cause the at least one processor to determine a first echo time delay value based on binary arrays of respective frames of the reference signal and the signal to be processed.

An aspect of an exemplary embodiment provides a non-transitory computer-readable storage medium having stored therein a computer readable code executable by a processor to perform:

obtaining an audio signal transmitted through air and acquired by an audio input device of terminal equipment when detecting a call access request, the audio signal corresponding to an audio output by an audio output device of the terminal equipment;

converting the audio signal to obtain a signal to be processed;

determining a reference signal corresponding to the audio signal;

determining a binary array, including binary values of all frequency bins, of each frame of the reference signal and a binary array, including binary values of all frequency bins, of each frame of the signal to be processed; and determining a first echo time delay value based on binary arrays of respective frames of the reference signal and the signal to be processed.

An aspect of an exemplary embodiment provides an echo time delay detection method, including:

obtaining an audio signal transmitted through air and acquired by an audio input device of terminal equipment when detecting a call access request, the audio signal corresponding to an audio output by an audio output device of the terminal equipment;

converting the audio signal to obtain a signal to be processed;

determining a reference signal corresponding to the audio signal; and determining a first echo time delay value according to the reference signal and the signal to be processed.

Another aspect of an exemplary embodiment provides an echo elimination device, including: at least one memory operable to store program code; and at least one processor operable to read the program code, and operate as instructed by the program code to:

obtain an audio signal transmitted through air and acquired by an audio input device of terminal equipment when detecting a call access request, the audio signal corresponding to an audio output by an audio output device of the terminal equipment;

convert the audio signal to obtain a signal to be processed:

determine a reference signal corresponding to the audio signal; and determine a first echo time delay value according to the reference signal and the signal to be processed.

Another aspect of an exemplary embodiment further provides terminal equipment, including: the echo elimination device, the audio output device, and the audio input device, where the audio output device is configured to output the audio; and the audio input device is configured to acquire an audio signal output by the audio output device and transmitted through air.

BRIEF DESCRIPTION OF THE DRAWINGS

The above and/or other aspects of the disclosure will become apparent and more readily appreciated from the following description of the exemplary embodiments, taken in conjunction with the accompanying drawings.

DETAILED DESCRIPTION

The following description clearly and completely describes the technical solutions in the exemplary embodiments with reference to the accompanying drawings. It should be noted that the described embodiments are only some embodiments instead of all embodiments of the disclosure. All other embodiments that can be obtained by a person of ordinary skill in the art based on the exemplary embodiments shall fall within the protection scope of the disclosure.

It should be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Terms described herein are selected by considering functions in an exemplary embodiment and meanings may vary depending on, for example, a user or operator's intentions or customs. Therefore, in the following embodiments, when terms are specifically defined, the meanings of terms should be interpreted based on definitions, and otherwise, should be interpreted based on general meanings recognized by those skilled in the art.

As used herein, the singular forms are intended to include the plural forms as well, unless the context clearly indicates otherwise. It will be further understood that the terms "comprises" and/or "comprising," or "includes" and/or "including" when used in this description, specify the presence of stated features, numbers, steps, operations, elements, components or combinations thereof, but do not preclude the presence or addition of one or more other features, numbers, steps, operations, elements, components or combinations thereof.

The "unit" or "module" used herein may be a hardware component such as a processor or a circuit, and/or a software component that is executed by a hardware component such as a processor.

Figure 1:
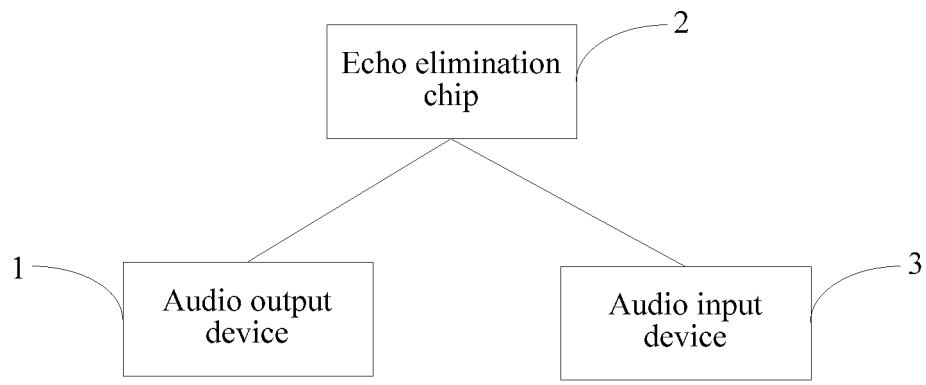
FIG. 1 is a structural block diagram of terminal equipment according to an exemplary embodiment.

FIG. 1 is a structural block diagram of terminal equipment according to an exemplary embodiment.

The echo time delay detection method may be implemented based on the terminal equipment shown in FIG. 1. The terminal equipment may be a user equipment having an audio output and input capacity, such as, for example but not limited to, a mobile phone, a tablet computer, or a notebook computer.

Referring to FIG. 1, the terminal equipment provided in an exemplary embodiment may include: an audio output device 1, an echo elimination chip 2, and an audio input device 3.

The audio output device 1 may be a device having an audio output capability such as a speaker or a sound box.

The echo elimination chip 2 may be, for example, a circuit having a signal processing capability, a control chip, or a processing chip.

The audio input device 3 may be a device having an audio acquisition capability such as a microphone.

In an exemplary embodiment, the echo elimination chip 2 may control, when detecting a call access request, the audio input device 3 to acquire an audio signal output by the audio output device 1 and transmitted through air and to convert the acquired audio signal into a signal to be processed in a digital signal format, and determine a reference signal in the digital signal format corresponding to the audio signal output by the audio output device 1, so as to determine, according to the reference signal and the signal to be processed, an echo time delay value in a stage in which the call access request is detected.

The echo elimination chip 2 may timely and accurately perform echo elimination in the call process as long as the echo elimination chip 2 performs echo elimination by using the echo time delay value at least at the first time (or at an initial time or an initial stage) in the call process. Therefore, the echo time delay detection method according to an exemplary embodiment may solve the problem in the related art that echo elimination cannot be performed at the primary stage of the call due to the fact that the echo time delay is not determined.

Optionally, the call access request may be transmitted by a terminal in the call to a baseband chip (not shown) of the terminal equipment via a base station or a network device, and then transmitted by the baseband chip to the echo elimination chip 2 of the terminal equipment, thereby implementing detection of the call access request by the echo elimination chip 2.

Optionally, if a user sets providing a prompt when the terminal equipment receives a call access request, for example, giving a ring, the baseband chip may control the audio output device 1 to output an audio signal, so that the audio input device 3 re-acquires the audio signal that is output and transmitted through air.

On the other hand, when the call access request is detected, the echo elimination chip 2 also may control the audio output device 1 to output an audio signal.

The following description describes the echo time delay detection method provided in an exemplary embodiment from the perspective of the echo elimination chip. Cross-reference may be made between the echo time delay detection method described below and the above-described exemplary embodiment.

Figure 2:
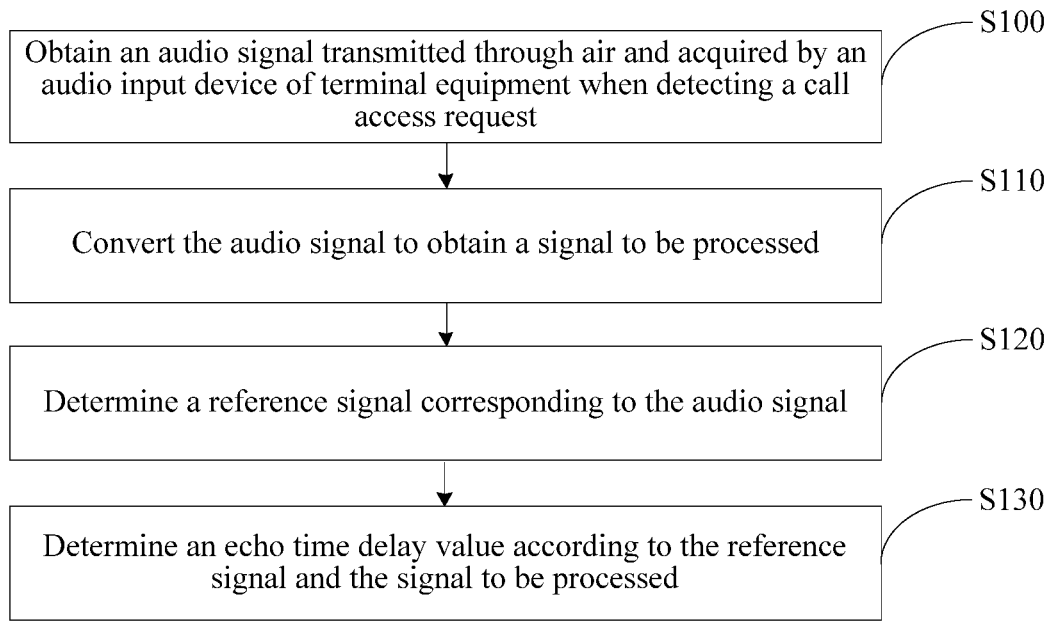
FIG. 2 is a schematic flowchart of an echo time delay detection method according to an exemplary embodiment.

FIG. 2 is a schematic flowchart of an echo time delay detection method according to an exemplary embodiment.

The method may be applied to an echo elimination chip. The echo elimination chip may be configured in terminal equipment, and further an audio output device and an audio input device may be configured in the terminal equipment.

Referring to FIG. 2, the echo time delay detection method provided in an exemplary embodiment may include:

Step S100: Obtain an audio signal transmitted through air and acquired by the audio input device of the terminal equipment when detecting a call access request.

The call access request may be request information sent by another terminal to the terminal equipment and used for requesting to create a call connection with the terminal equipment. After the terminal equipment receives the call access request, the terminal equipment shows a call request interface and/or reminds a terminal user (or a user of terminal equipment) by means of ringing, vibrating, or the like, where the reminding method is not limited to this, and can be determined according to settings of users, and waits for the terminal user to reply to the call access request.

After the terminal equipment obtains the call access request, the terminal equipment may reply to the call access request by means of a user operation. Replying to the call access request specifically includes: determining to answer the call or rejecting to answer the call, which is determined according to a replying operation of the user. That is, the application stage of the method shown in FIG. 2 may be considered to be a process from detecting, by the echo elimination chip, the call access request to detecting the reply to the call access request from the user.

Optionally, in an exemplary embodiment, a baseband chip of the terminal equipment transmits, after receiving the call access request, the call access request to the echo elimination chip, to implement detection on the call access request by the echo elimination chip. Information for replying to the call access request by the user may also be detected by the baseband chip and then transmitted to the echo elimination chip.

The audio signal transmitted through air and acquired by the audio input device may correspond to an audio output by the audio output device of the terminal equipment. That is, when detecting the call access request, the echo elimination chip may control the audio input device to acquire the audio signal output by the audio output device and transmitted through air.

When detecting the call access request, the baseband chip controls the audio output device to output the audio signal (for example, a conventional ring), or the echo elimination chip controls the audio output device to output the audio signal. If the echo elimination chip controls the audio output device to output the audio, in an exemplary embodiment, the audio output device may also be controlled to output the audio when detecting the call access request.

The audio output by the audio output device may be implemented based on a corresponding reference signal. In an exemplary embodiment, the reference signal in a digital format may be converted into an audio in an analog signal format, and the audio signal in an analog signal format may be output by the audio output device.

Optionally, the reference signal may be a ring file, set by the terminal user or stored in the terminal equipment by default, and may be used when receiving the call access request. It should be noted that the reference signal is not limited to the ring file, and may also be other preset files capable of outputting an audio.

Step S110: Convert the audio signal to obtain a signal to be processed.

After receiving the audio signal transmitted through air and acquired by the audio input device, in an exemplary embodiment, the audio signal in an analog signal format may be converted into a signal to be processed in a digital signal format, for subsequent processing.

Step S120: Determine a reference signal corresponding to the audio signal.

Optionally, the reference signal is a basis of an audio output of the audio output device when the terminal equipment obtains the call access request. The reference signal is in a digital signal format, and the audio signal output by the audio output device may be an analog signal obtained after performing digital-to-analog conversion on the reference signal.

Because the audio that is output by the audio output device, when the terminal equipment obtains the call access request, is generally implemented by a reference signal such as a ring file set by the terminal user or stored in the terminal equipment by default, the echo elimination chip may preset a reference signal and retrieve the preset reference signal when it is needed, thereby implementing determining of the reference signal corresponding to the audio signal.

Optionally, in an exemplary embodiment, the echo elimination chip may also be electrically connected to the audio output device. That is, a signal may be transmitted between the echo elimination chip and the audio output device. Therefore, the echo elimination chip may obtain the reference signal from the audio output device connected to the echo elimination chip, thereby implementing determining of the reference signal. It should be noted that when the audio output device outputs the audio signal, the reference signal needs to be input to the audio output device, so that the audio output device performs digital-to-analog conversion on the reference signal and outputting the converted reference signal, thereby implementing outputting of the audio signal. Therefore, the echo elimination chip may obtain the reference signal from the audio output device by obtaining the reference signal that is input to the audio output device.

Step S130: Determine an echo time delay value according to the reference signal and the signal to be processed.

Optionally, the determined echo time delay value may be used for performing echo elimination in a call process at least at the initial stage. That is, in the call process, the echo elimination chip may use the echo time delay value determined in the stage in which the call access request for performing echo elimination is detected, or may also always use the echo time delay value for performing echo elimination throughout the call process. However, it is not excluded in an exemplary embodiment that echo elimination is performed at least at the initial stage by using the echo time delay value determined in the stage in which the call access request in the call process is detected, and then echo elimination is subsequently performed by using an echo time delay value determined in the call process.

The echo time delay detection method provided in an exemplary embodiment includes: obtaining an audio signal transmitted through air and acquired by an audio input device of terminal equipment when detecting a call access request, the audio signal corresponding to an audio output by an audio output device of the terminal equipment; converting the audio signal to obtain a signal to be processed; determining a reference signal corresponding to the audio signal; and determining an echo time delay value according to the reference signal and the signal to be processed. In can be learned that, in an exemplary embodiment, the audio signal transmitted through air and acquired by the audio input device is obtained when the echo elimination chip detects a call access request and the echo time delay value is determined according to the corresponding signal to be processed after converting the obtained audio signal and the reference signal of the audio signal, thereby implementing determining of the echo time delay value at the stage in which the call access request is detected. That is, the echo time delay value is determined before the call, thereby providing a basis for timely and accurately performing echo elimination in the call process.

Optionally, the echo time delay detection method provided in an exemplary embodiment may be applied to any call application installed in the terminal equipment, thereby implementing determining of the echo time delay value used for eliminating an echo in a call process of the call application.

Optionally, in an exemplary embodiment, the echo time delay value may be used for performing echo elimination at least at the initial stage when detecting the call speech signal. Detecting the call speech signal indicates that the terminal equipment accesses a call, and in an exemplary embodiment, in the process starting from accessing to ending of the call of the terminal equipment, echo elimination is performed by using the echo time delay value at least at the initial stage, so as to eliminate an echo generated in the call process, and improve the quality of the call. In the call process, the call speech signal of the terminal user and the counterpart is continuously detected.

Optionally, the call speech signal may be acquired by the audio input device and processed and determined by the echo elimination chip.

Specifically, in a process starting from accessing to ending of the call of the terminal equipment, the audio output device of the terminal equipment outputs the audio signal transmitted from the counterpart, and the audio input device of the terminal equipment acquires a call audio of the terminal user and re-acquires the audio signal output by the audio output device. In this process, in an exemplary embodiment, echo elimination may be performed, according to the determined echo time delay value, on the call audio of the terminal user acquired by the audio input device and the audio signal output by the audio output device and re-acquired by the audio input device, so that the audio transmitted by the terminal equipment to the counterpart corresponds to the call audio of the terminal user, thereby improving the quality of the call.

Optionally, the echo time delay may fluctuate, and therefore in an exemplary embodiment, an echo time delay value may also be determined according to the audio signal output by the audio output device of the terminal equipment (corresponding to the audio of the counterpart) and the corresponding audio signal re-acquired by the audio input device in the process starting from accessing to ending of the call, so as to further perform echo elimination by using the new echo time delay value determined subsequently.

That is, in an exemplary embodiment, a first echo time delay value may be determined according to the signal to be processed and reference signal corresponding to the audio signal re-acquired by the audio input device in the process starting from receiving the call access request to replying to the call access request by the terminal equipment, and echo elimination is performed by using the first echo time delay value when the terminal equipment accesses a call at least at the initial stage. In addition, in an exemplary embodiment, a second echo time delay value may also be determined cyclically, after accessing the call, according to the audio signal output by the audio output device and the audio signal re-acquired by the audio input device, and echo elimination is performed by using the second echo time delay value in the subsequent call process, thereby ensuring effective elimination of an echo signal in the call process.

Specifically, in an exemplary embodiment, the second echo time delay value may be determined according to the audio signal output by the audio output device and the corresponding audio signal re-acquired by the audio input device when detecting the call speech signal, and next echo elimination is performed by using the second echo time delay value.

Figure 3:
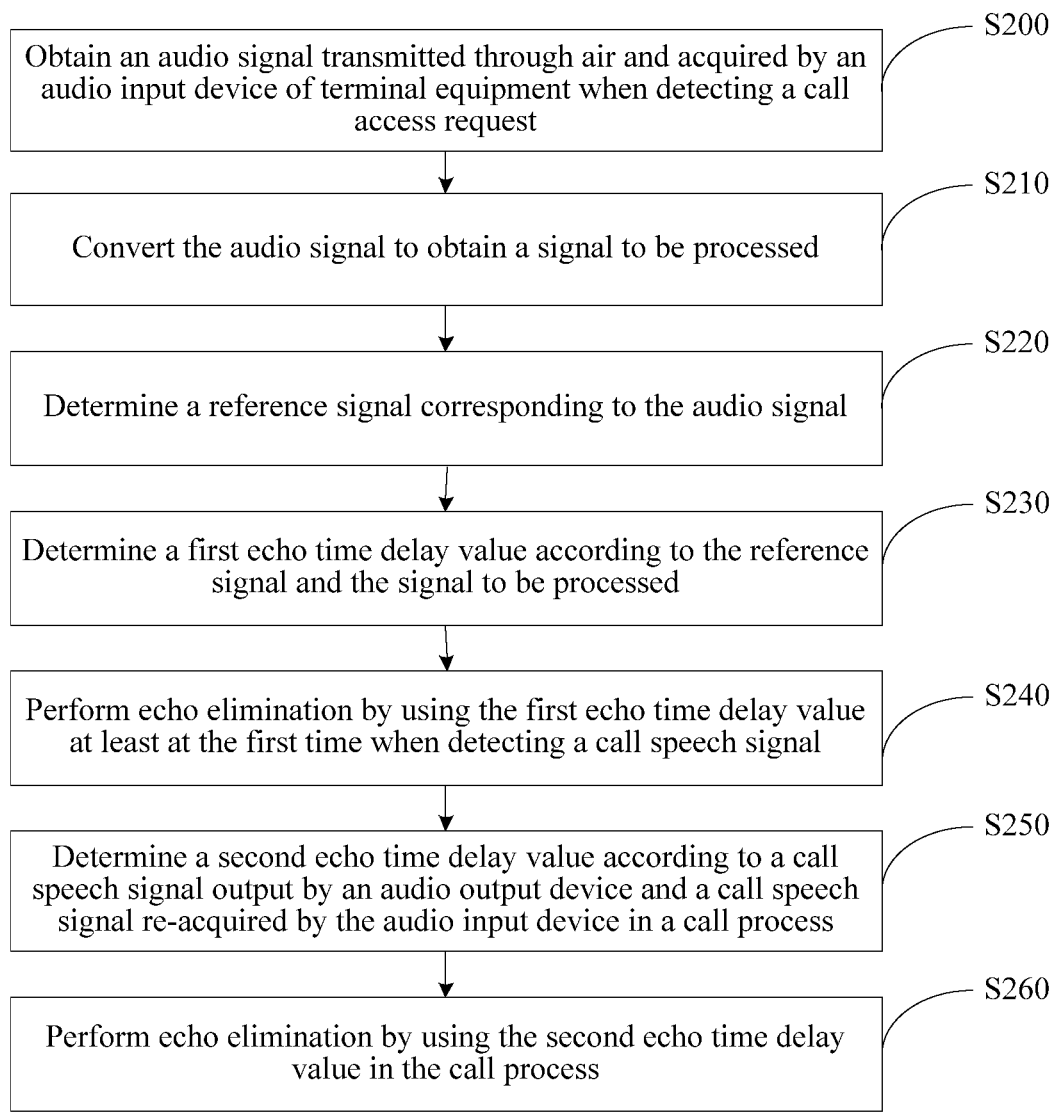
FIG. 3 is a schematic flowchart of an echo elimination method according to an exemplary embodiment.

Optionally, FIG. 3 shows a schematic flowchart of an echo elimination method according to an exemplary embodiment.

Referring to FIG. 3, the method may include:

Step S200: Obtain an audio signal transmitted through air and acquired by an audio input device of terminal equipment when detecting a call access request.

Step S210: Convert the audio signal to obtain a signal to be processed.

Step S220: Determine a reference signal corresponding to the audio signal.

Step S230: Determine a first echo time delay value according to the reference signal and the signal to be processed.

Step S240: Perform echo elimination by using the first echo time delay value at least at the initial stage when detecting a call speech signal.

Detecting the call speech signal indicates that the terminal equipment is in a call.

Step S250: Determine a second echo time delay value according to a call speech signal output by an audio output device and a call speech signal re-acquired by the audio input device in a call process.

Step S260: Perform echo elimination by using the second echo time delay value in the call process.

It should be noted that instead of starting detection of the echo time delay value after accessing the call, the first echo time delay value is determined in the process starting from receiving the call access request to replying to the call access request (that is, detecting the call access request) before accessing the call. In this manner, the first echo time delay value is obtained when the terminal equipment accesses the call, and echo elimination can be performed by using the first echo time delay value determined before the call, thereby reducing echo transmission in the call process. Although an echo time delay value is also measured in the call process, the measurement of the echo time delay value in the call process is performed at the same time with the echo elimination performed according to the echo time delay value determined before the call.

In the related art, when the terminal equipment uses a call application for the first time, the primary echo time delay value may be 0 if the call application is downloaded and used for the first time. However, in an exemplary embodiment, the echo time delay value may be determined and updated in the process starting from receiving the call access request to replying to the call access request, so that echo elimination can also be implemented in the call process even if a call application of the terminal equipment is used for the first time, thereby gaining a relatively good improved call quality.

The following describes the process of determining an echo time delay value according to a signal output by an audio output device and a corresponding signal re-acquired by an audio input device according to an exemplary embodiment. The following content may be generically applied to determining of an echo time delay value in a process starting from receiving a call access request to replying to the call access request, and determining of an echo time delay value in a process starting from accessing to ending of a call.

For convenience of explanation, determining of an echo time delay value is described by an example of a stage in which a call access request is detected, that is, a process starting from receiving the call access request to replying to the call access request. Corresponding reference may be made for determining of an echo time delay value in the process starting from accessing to ending of a call.

Optionally, in an exemplary embodiment, the preset reference signal may have a plurality of frames, and correspondingly, the audio output device may output an audio signal having a plurality of frames. The signal to be processed may have a plurality of frames, and correspondingly the audio input device may re-acquire an audio signal having a corresponding quantity of frames.

Figure 4:
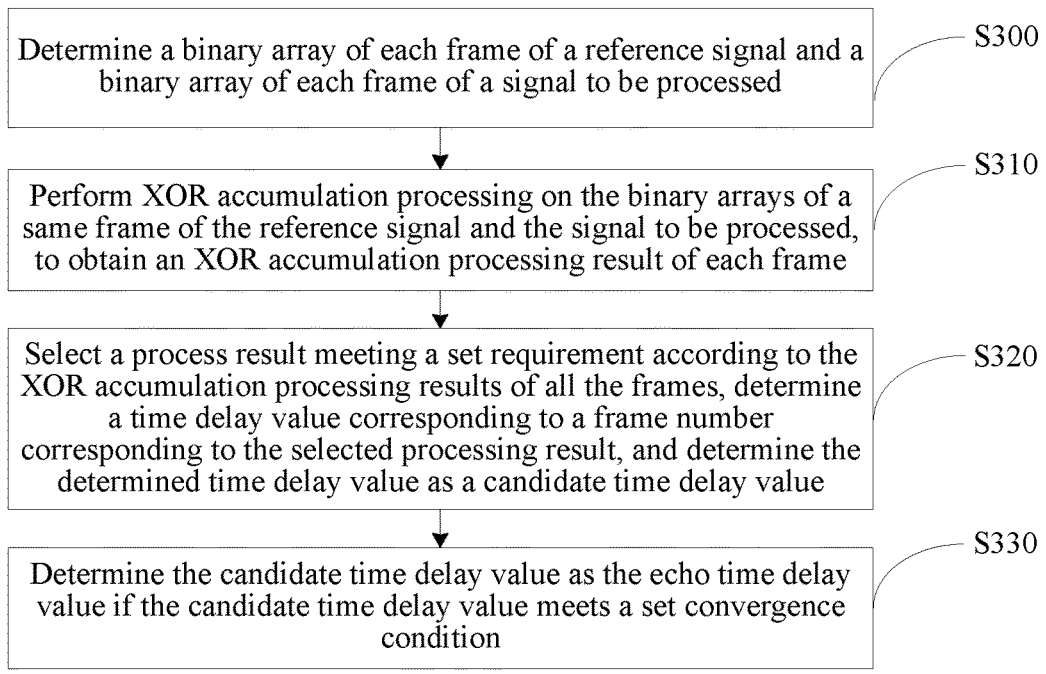
FIG. 4 is a schematic flowchart of a method for determining an echo time delay value according to an exemplary embodiment.

FIG. 4 shows a schematic flowchart of a method for determining an echo time delay value according to an exemplary embodiment. Referring to FIG. 4, the method may include:

Step S300: Determine a binary array of each frame of a reference signal and a binary array of each frame of a signal to be processed.

Optionally, the binary array of each frame of the reference signal may include binary values of all frequency bins of the frame of the reference signal, and the binary array of each frame of the signal to be processed may include binary values of all frequency bins of the frame of the signal to be processed.

Step S310: Perform XOR accumulation processing on the binary arrays of a same frame of the reference signal and the signal to be processed, to obtain an XOR accumulation processing result of each frame.

Step S320: Select a process result meeting a set requirement (or condition) according to the XOR accumulation processing results of all the frames, determine a time delay value corresponding to a frame number corresponding to the selected processing result, and determine the time delay value as a candidate time delay value.

Step S330: Determine the candidate time delay value as the echo time delay value if the candidate time delay value meets a set convergence condition.

The echo time delay value obtained in an exemplary embodiment may be a first echo time delay value, or may also be an echo time delay value. An adaptive iterative operation process is needed for the echo time delay detection, and in the process, the algorithm can be converged after multiple times of iteration, to obtain a relatively accurate and reliable echo time delay value. Therefore, in an exemplary embodiment, after determining the XOR accumulation processing results of all the frames, a processing result meeting the set requirement needs to be selected according to the XOR accumulation processing results of all the frames. In addition, by setting the convergence condition, whether the time delay value corresponding to the frame number based on the selected processing result meets the set convergence condition is determined. When the set convergence condition is met, the time delay value is considered to be converged after multiple times of iteration and to be a relatively accurate echo time delay detection result.

Optionally, to increase the accuracy of the calculated echo time delay value, in an exemplary embodiment, smooth processing may be performed on the XOR accumulation processing result of each frame to obtain a smooth XOR accumulation processing result of each frame, and a smooth XOR accumulation processing result meeting the set requirement may be selected from the smooth XOR accumulation processing results of all the frames. Specifically, in an exemplary embodiment, the smooth processing performed on the XOR accumulation processing result of each frame may be implemented according to a weighting factor corresponding to each frame of the signal to be processed.

Figure 5:
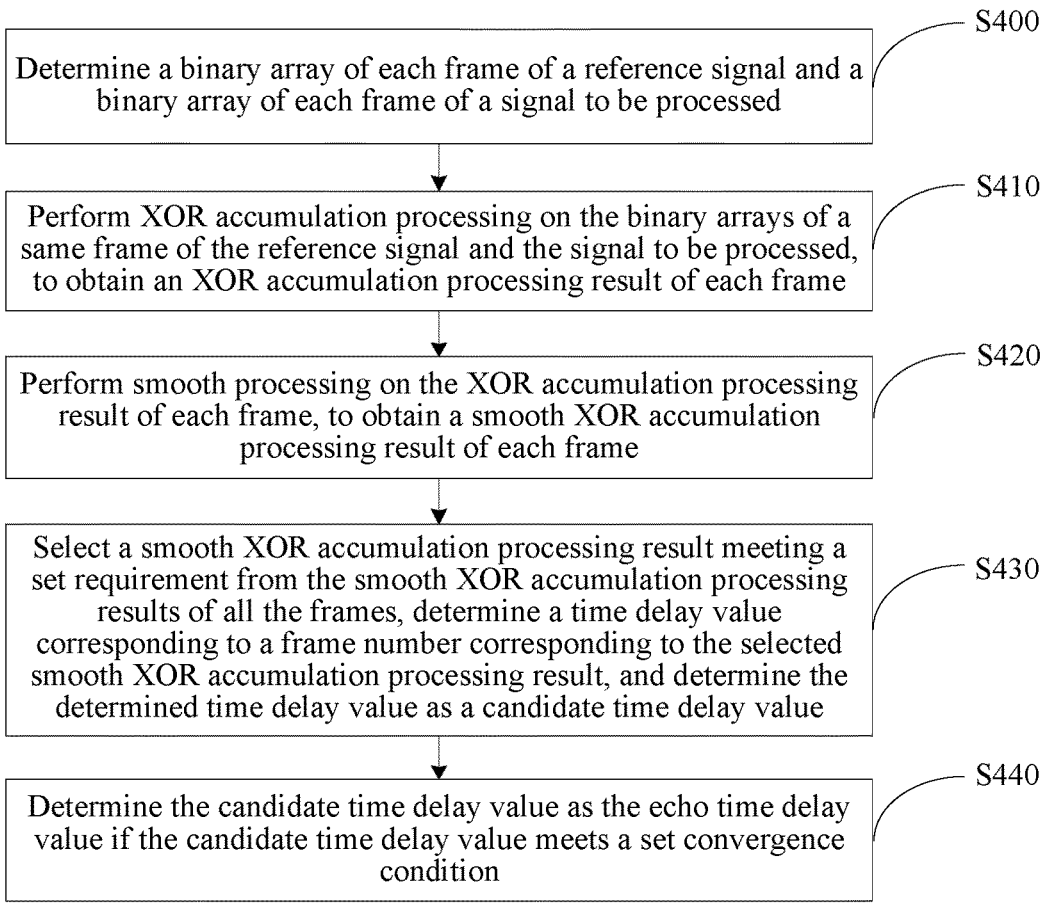
FIG. 5 is a schematic flowchart of another method for determining an echo time delay value according to an exemplary embodiment.

FIG. 5 shows a schematic flowchart of another method for determining an echo time delay value according to an exemplary embodiment.

Referring to FIG. 5, the method may include:

Step S400: Determine a binary array of each frame of a reference signal and a binary array of each frame of a signal to be processed.

Step S410: Perform XOR accumulation processing on the binary arrays of a same frame of the reference signal and the signal to be processed, to obtain an XOR accumulation processing result of each frame.

Step S420: Perform smooth processing on the XOR accumulation processing result of each frame, to obtain a smooth XOR accumulation processing result of each frame.

Optionally, in an exemplary embodiment, smooth processing may be performed on the XOR accumulation processing result of the corresponding frame according to a weighting factor corresponding to each frame of the signal to be processed, to obtain the smooth XOR accumulation processing result of each frame.

The weighting factor corresponding to each frame of the signal to be processed may be determined according to a Signal-to-Noise-Ratio average of all frequency bins of each frame of the signal to be processed. In an exemplary embodiment, smooth processing can be performed on the XOR accumulation processing result of each frame according to the Signal-to-Noise-Ratio average of all frequency bins of each frame of the signal to be processed, to enable the XOR accumulation processing result of each frame after the smooth processing to become more accurate. Therefore, the accuracy of subsequent determining of the echo time delay value is increased.

Step S430: Select a smooth XOR accumulation processing result meeting a set requirement from the smooth XOR accumulation processing results of all the frames, determine a time delay value corresponding to a frame number corresponding to the selected smooth XOR accumulation processing result, and determine the time delay value as a candidate time delay value.

Optionally, in an exemplary embodiment, output time points corresponding to all the frames of the reference signal and acquisition time points corresponding to all the frames of signal to be processed are recorded. After the terminal equipment re-acquires a frame of signal, the time delay value of the frame may be considered to be a difference between the acquisition time point corresponding to the frame of the signal to be processed and the output time point corresponding to the frame of the reference signal.

That is, in an exemplary embodiment, a frame number corresponding to the selected smooth XOR accumulation processing result may be determined, and a difference between the acquisition time point of the signal to be processed corresponding to the frame number and the output time point of the corresponding reference signal is determined as the time delay value corresponding to the frame number.

Step S440: Determine the candidate time delay value as the echo time delay value if the candidate time delay value meets a set convergence condition.

The echo time delay value obtained in an exemplary embodiment may be a first echo time delay value, or may also be an echo time delay value. Optionally, the method shown in FIG. 5 of selecting the processing result meeting the set requirement after performing smooth processing on the XOR accumulation processing result corresponding to each frame is merely an example. The method of selecting a processing result meeting the set requirement directly from the XOR accumulation processing results corresponding to all the frames is not excluded in an exemplary embodiment.

Figure 6:
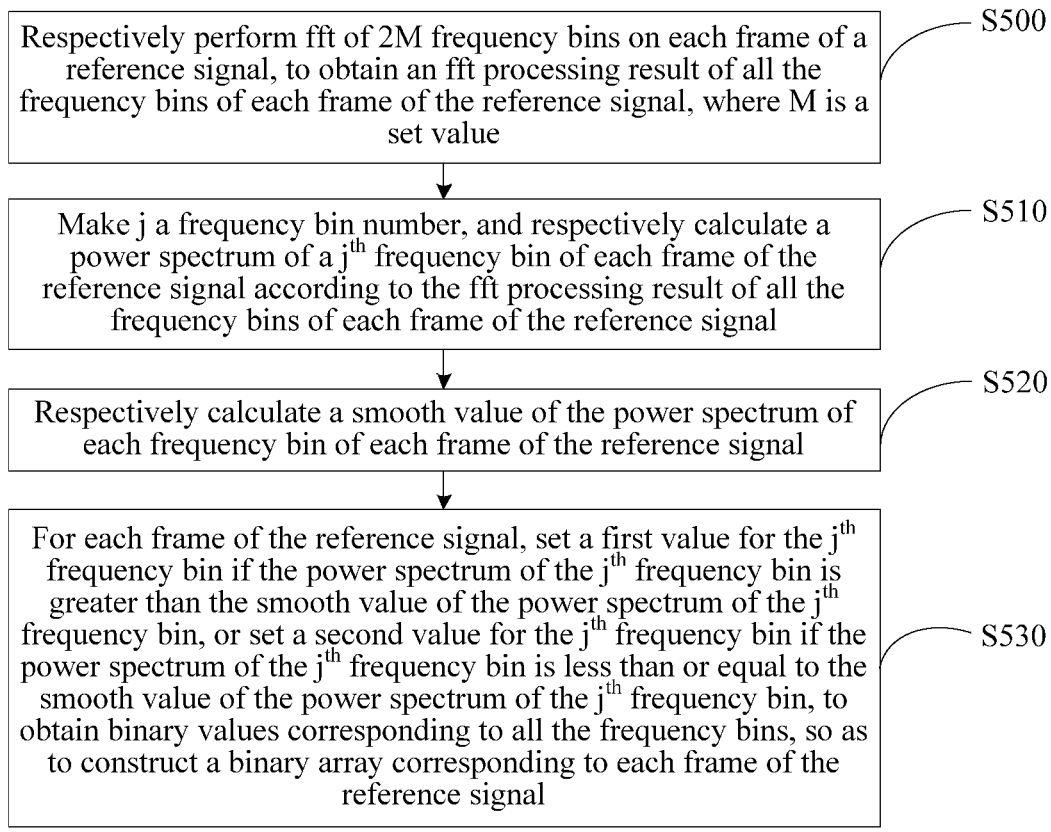
FIG. 6 is a schematic flowchart of a method for determining a binary array of each frame of a reference signal according to an exemplary embodiment.

Optionally, as shown in FIG. 6, the process of determining a binary array corresponding to each frame of the reference signal may include:

Step S500: Respectively perform fast fourier transform (fft) of 2M frequency bins on each frame of a reference signal, to obtain an fft processing result of all the frequency bins of each frame of the reference signal, where M is a set value.

Step S510: Make j a frequency bin number, and respectively calculate a power spectrum Ref(j) of a $j^{th}$ frequency bin of each frame of the reference signal according to the fft processing result of all the frequency bins of each frame of the reference signal.

Herein, j is an integer in a range of m1 to m2, m1 is obtained by rounding down a calculation result of $(M*a)/(fs*c)$, m2 is obtained by rounding down a calculation result of $(M*b)/(fs*c)$, a is a first set value, b is a second set value, c is a third set value, and fs is an acquisition frequency of the reference signal of the audio.

Optionally, a is 500, b is 1200, and c is 2. Correspondingly, m1 is obtained by using a formula $INT[(M*500)/(fs*2)]$, and m2 is obtained by using a formula $INT[(M*1200)/(fs*2)]$, where INT represents down rounding. The specific values of a, b, and c may be determined according to an actual situation, and the foregoing values are used as an example only.

In an exemplary embodiment, the power spectrum corresponding to the $j^{th}$ frequency bin may be represented by Ref(j), where $j \in (m1, m2)$.

Step S520: Respectively calculate a smooth value of the power spectrum Ref(j) of each frequency bin of each frame of the reference signal.

Optionally, in an exemplary embodiment, the smooth value corresponding to the power spectrum of the $j^{th}$ frequency bin of one frame of the reference signal may be made Refsm(j), and the smooth value corresponding to the power spectrum of the $j^{th}$ frequency bin of the frame of the reference signal may be calculated by using the following code in an exemplary embodiment:

$$Refsm(j)=0.98*Refsm(j)+0.02Ref(j).$$

Step S530: For each frame of the reference signal, set a first value for the $j^{th}$ frequency bin if the power spectrum of the $j^{th}$ frequency bin is greater than the smooth value of the power spectrum of the $j^{th}$ frequency bin, or set a second value for the $j^{th}$ frequency bin if the power spectrum of the $j^{th}$ frequency bin is less than or equal to the smooth value of the power spectrum of the $j^{th}$ frequency bin, to obtain binary values corresponding to all the frequency bins, so as to construct a binary array corresponding to each frame of the reference signal.

For each frame of the reference signal, in an exemplary embodiment, Ref(j) is compared with Refsm(j), and if Ref(j) is greater than Refsm(j), the first value (for example, 1) is set for the $j^{th}$ frequency bin, or otherwise the second value (for example, 0) is set for the $j^{th}$ frequency bin, by which manner, the binary values corresponding to all the frequency bins of each frame of the reference signal can be obtained, to construct the binary array of each frame of the reference signal.

Optionally, the process of determining a binary array corresponding to each frame of the signal to be processed is similar to the process of determining a binary array corresponding to each frame of the reference signal. That is, the process of determining a binary array corresponding to each frame of the reference signal may be as follows:

for each frame of the reference signal, performing fft of 2M frequency bins, to obtain an fft processing result of all the frequency bins:

making j a frequency bin number, and for each frame of the reference signal, calculating a power spectrum Ref(j) corresponding to a $j^{th}$ frequency bin according to the fft processing result of all the frequency bins;

for each frame of the reference signal, calculating a smooth value of Ref(j) of the $j^{th}$ frequency bin; and for each frame of the reference signal, setting a first value for the $j^{th}$ frequency bin if the power spectrum of the $j^{th}$ frequency bin is greater than the smooth value of the power spectrum of the j frequency bin, or setting a second value for the $j^{th}$ frequency bin if the power spectrum of the $j^{th}$ frequency bin is less than or equal to the smooth value of the power spectrum of the $j^{th}$ frequency bin, to obtain binary values corresponding to all the frequency bins, so as to construct a binary array corresponding to each frame of the reference signal.

Figure 7:
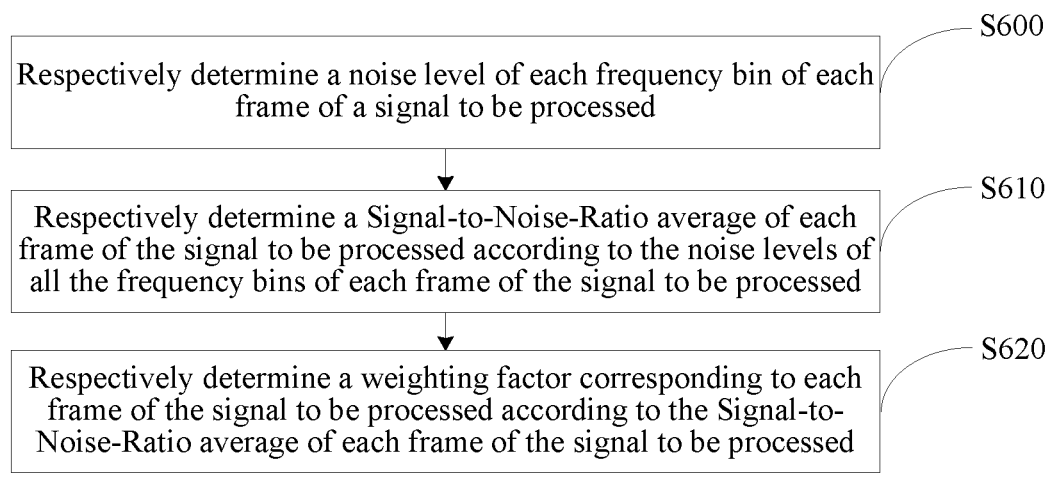
FIG. 7 is a schematic flowchart of a method for determining a weighting factor corresponding to each frame of a signal to be processed according to an exemplary embodiment.

Optionally, as shown in FIG. 7, the process of determining a weighting factor corresponding to each frame of a signal to be processed may include:

Step S600: Respectively determine a noise level of each frequency bin of each frame of a signal to be processed.

In an exemplary embodiment, for each frame of the signal to be processed, a noise level of each frequency bin is determined. A noise level corresponding to a $j^{th}$ frequency bin of each frame of the signal to be processed may be made N(j). Correspondingly, j is an integer in a range of m1 to m2, m1 is obtained by rounding down a calculation result of (M*a)/(fs*c), m2 is obtained by rounding down a calculation result of (M*b)/(fs*c), a is a first set value, b is a second set value, c is a third set value, and fs is an acquisition frequency of the reference signal of the audio.

Step S610: Respectively determine a Signal-to-Noise-Ratio average of each frame of the signal to be processed according to the noise levels of all the frequency bins of each frame of the signal to be processed.

Optionally, for each frame of the signal to be processed, in an exemplary embodiment, the Signal-to-Noise-Ratio average corresponding to each frequency bin may be calculated according to a formula $$SNR = \sum_{j=m1}^{m2} [Cap(j)/N(j)/(m2-m1)],$$

where SNR is the Signal-to-Noise-Ratio average corresponding to each frequency bin of one frame of the signal to be processed, and Cap(j) represents the power spectrum of the $j^{th}$ frequency bin of one frame of the signal to be processed.

Step S620: Respectively determine a weighting factor corresponding to each frame of the signal to be processed according to the Signal-to-Noise-Ratio average of each frame of the signal to be processed.

Optionally, for each frame of the signal to be processed, the weighting factor of each frame of the signal to be processed may be determined according to a formula s=$\log_2$(SNR/d), where s is the weighting factor corresponding to one frame of the signal to be processed, and d is a fourth set value. The specific value of d may be determined according to an actual situation, and for example, d may be selected to be 8.

Optionally, the process of performing XOR accumulation processing on binary arrays corresponding to a same frame of the reference signal and the signal to be processed may be as follows.

Performing XOR accumulation processing on binary arrays corresponding to the reference signal and the signal to be processed includes:

making i a frame number, where i is an integer in a range of 0 to n−1, and n is the total number of frames of the reference signal, and performing XOR accumulation processing on the binary arrays of an $i^{th}$ frame of the reference signal and an $i^{th}$ frame of the signal to be processed according to a formula $$CoxrR(i) = \sum_{j=m1}^{m2} [Capb(j) \; Xor \; Refbbur(i)(j)],$$

where

Capb(j) represents a binary value of the $j^{th}$ frequency bin of the $i^{th}$ frame of the signal to be processed. Refbbur (i)(j) represents a binary value of the $j^{th}$ frequency bin of the $i^{th}$ frame of the reference signal, CoxrR(i) represents an XOR accumulation processing result corresponding to the $i^{th}$ frame, and Xor represents XOR processing.

Optionally, in an exemplary embodiment, XOR accumulation processing results of several frames prior to the current frame may be buffered, to obtain XOR accumulation processing results of n frames, and smooth processing may be performed on the XOR accumulation processing result corresponding to each frame. Smooth processing performed on the XOR accumulation processing result corresponding to each frame may be implemented according to code: CxorRsm(i)=(1−d)*CxorRsm(i)+d*CxorR(i), where i is a frame number, and CxorRsm(i) is an smooth XOR accumulation processing result of the $i^{th}$ frame.

When selecting a smooth XOR accumulation processing result meeting a set requirement, in an exemplary embodiment, the smooth XOR accumulation processing results of n frames may be used as a unit, and the smooth XOR accumulation processing result meeting a set requirement is selected from the smooth XOR accumulation processing results of the n frames.

The specific process may be: selecting a smooth XOR accumulation processing result having a minimum value from the smooth XOR accumulation processing results of the n frames.

Correspondingly, in an exemplary embodiment, a time delay value corresponding to a frame number corresponding to the smooth XOR accumulation processing result having the minimum value, among the smooth XOR accumulation processing results of the n frames, is determined as a candidate time delay value. Further, if the candidate time delay value meets a set convergence condition, the candidate time delay value is used as an echo time delay value.

Optionally, the following three conditions need to be satisfied if the candidate time delay value meets the set convergence condition:

a difference between a maximum value and the minimum value of the smooth XOR accumulation processing results of the n frames is greater than a set difference threshold, and the difference threshold is, for example, 5.5:

the minimum value of the smooth XOR accumulation processing results of the n frames is less than a set threshold, and the set threshold is, for example, 17.5; and the candidate time delay value is kept unchanged for K frames, the K frames include a plurality of successive n frames, and one candidate time delay value is calculated correspondingly for each n frames.

Optionally, in the process starting from receiving the call access request to replying to the call access request, the audio signal output by the audio output device may have a plurality of K frames. Therefore, in an exemplary embodiment, the echo time delay value may be determined cyclically for multiple times and the echo elimination is performed by using a newly determined echo time delay value in the process starting from receiving the call access request to replying to the call access request.

Optionally, after determining the reference signal and the signal to be processed, from the perspective of processing each frame of the reference signal and signal to be processed, the process of determining an echo time delay value may be as follows:

(1) Perform fft of 2M frequency bins on a current frame of the reference signal, and then calculate a power spectrum Ref(j) of each frequency bin, where j represents a frequency bin number, j∈(m1, m2), m1=INT[(M*500)/(fs*2)], and m2=INT[(M*1200)/(fs*2)].

Calculate a smooth value Refsm(j) of the power spectrum Ref(j) of each frequency bin. The step may be specifically implemented by using code: Refsm(j)=0.98*Refsm(j)+0.02Ref(j).

Compare each Ref(j) with each Refsm(j), and if Ref(j) is greater than Refsm(j), and set 1 for the corresponding frequency bin, or otherwise set 0 for the corresponding frequency bin, to obtain a binary array constructed by binary values of all the frequency bins of the current frame of the reference signal.

Buffer binary arrays of n frames, and store Ref(j) to a Refbbuf(i)(j) array.

(2) Perform fft of 2M frequency bins on a current frame of the signal to be processed, and then calculate a power spectrum Cap(j) of each frequency bin, where j represents a frequency bin number, j∈(m1, m2), m1=INT[(M*500)/(fs*2)], and m2=INT[(M*1200)/(fs*2)].

Calculate a smooth value Capsm(j) of the power spectrum Cap(j) of each frequency bin. The step may specifically implemented by using code: Capsm(j)=0.98*Capsm(j)+0.02Cap(j).

Compare each Cap(j) with each Capsm(j), and if Cap(j) is greater than Capsm(j), and set 1 for the corresponding frequency bin, or otherwise set 0 for the corresponding frequency bin, to obtain a binary array constructed by binary values of all the frequency bins of the current frame of the reference signal.

(3) For the current frame of the signal to be processed, calculate a noise level N(j) of each frequency bin based on a Minima Controlled Recursive Averaging (MCRA) algorithm; calculate a Signal-to-Noise-Ratio average of each frequency bin:

$$SNR = \sum_{j=m1}^{m2} [Cap(j)/N(j)/(m2-m1)];$$

and calculate a weighting factor of the current frame: a=$\log_2$(SNR/8).

(4) Perform XOR accumulation processing:

$$CoxrR(i) = \sum_{j=m1}^{m2} [Capb(j) \; Xor \; Refbbur(i)(j)];$$

and perform smooth processing on the XOR accumulation processing result of the current frame: CxorRsm(i)=(1−a)*CxorRsm(i)+a*CxorR(i), where i is a frame number.

(5) Use a time delay value corresponding to a frame number of a minimum value, among n CxorRsm(i) values, as a candidate time delay value.

(6) Determine the candidate time delay value as the determined echo time delay value if the candidate time delay value satisfies the following convergence conditions:

a peak-valley difference of the n CxorRsm(i) values is greater than 5.5;

a minimum value of CxorRsm(i) is less than 17.5; and the candidate time delay value is kept unchanged for K frames, and the K frames are composed of a plurality of successive n frames.

Optionally, in an exemplary embodiment, there may be a case in which the echo time delay value meeting the set convergence condition is not determined in the process starting from receiving the call access request to accessing the call. In this case, in an exemplary embodiment, echo elimination may be performed by using a historical echo time delay value in the process starting from accessing the call to ending the call, so as to ensure performing of echo elimination in the call process.

Specifically, in an exemplary embodiment, if the echo time delay value meeting the set convergence condition is not determined when the call access request is detected, echo elimination may be performed by using the historical echo time delay value, where the historical echo time delay value is an echo time delay value determined at a previous time when the call access request is detected or an echo time delay value determined in a previous call.

The following describes an example of application provided in an exemplary embodiment:

When a mobile phone receives a call access request, the mobile phone retrieves a ring file (or reference signal) and reminds a user by playing a corresponding ring using a speaker.

A microphone of the mobile phone re-acquires a ring signal.

An echo elimination chip of the mobile phone converts the re-acquired ring signal into a signal to be processed.

The echo elimination chip of the mobile phone determines an echo time delay value according to processing of the signal to be processed and the ring file.

When the user confirms to answer the call, the ringing ends, and the mobile phone accesses the call. At this time, the echo elimination chip of the mobile phone eliminates, by using the echo time delay value at least at the initial stage, an echo signal acquired by the microphone.

By the echo time delay detection method provided in an exemplary embodiment, an echo time delay value can be determined before a call, thereby providing a basis for timely and accurately performing echo elimination in a call process.

The following describes the echo elimination chip provided in an exemplary embodiment. Cross-reference may be made between the echo elimination chip described below and the foregoing echo time delay detection method described from the perspective of the echo elimination chip.

Figure 8:
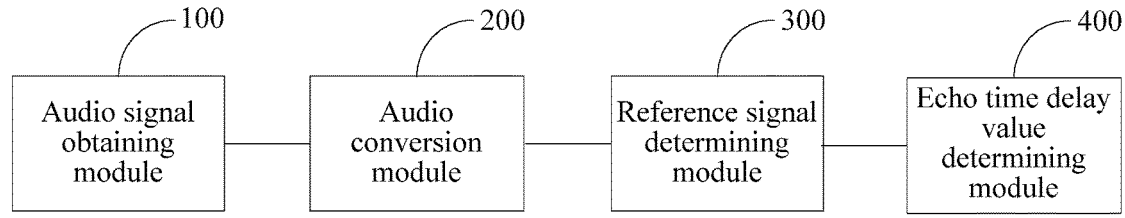
FIG. 8 is a structural block diagram of an echo elimination chip according to an exemplary embodiment.

FIG. 8 is a structural block diagram of an echo elimination chip (or echo elimination device) according to an exemplary embodiment.

Referring to FIG. 8, the echo elimination chip may include:

an audio signal obtaining module 100, configured to obtain an audio signal transmitted through air and acquired by an audio input device of terminal equipment when detecting a call access request, the audio signal corresponding to an audio output by an audio output device of the terminal equipment;

an audio conversion module 200, configured to convert the audio signal to obtain a signal to be processed;

a reference signal determining module 300, configured to determine a reference signal corresponding to the audio signal; and an echo time delay value determining module 400, configured to determine a first echo time delay value according to the reference signal and the signal to be processed.

Figure 9:
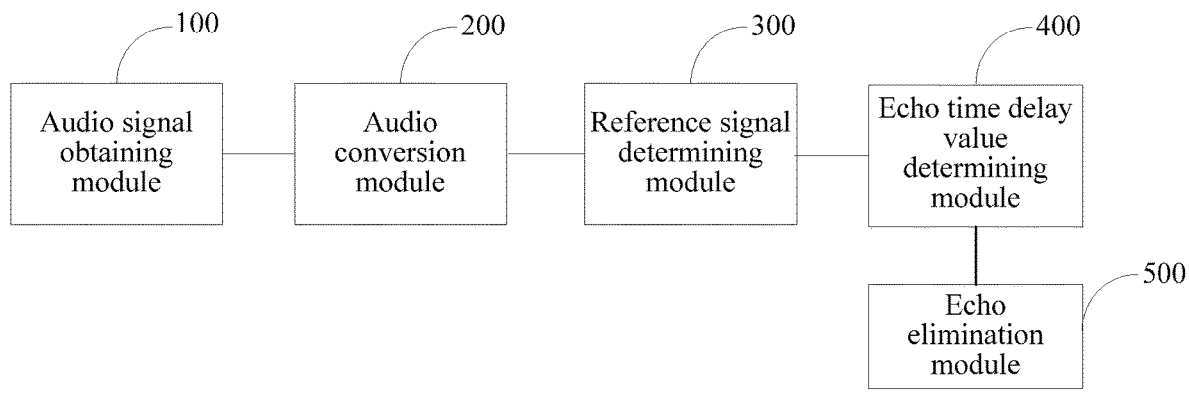
FIG. 9 is another structural block diagram of an echo elimination chip according to an exemplary embodiment.

Optionally, FIG. 9 is another structural block diagram of an echo elimination chip (or echo elimination device) according to an exemplary embodiment. In combination with FIG. 8 and FIG. 9, the echo elimination chip may further include:

an echo elimination 500, configured to perform echo elimination by using the first echo time delay value at least at the initial stage when detecting a call speech signal.

Optionally, the echo elimination method may be, for example, an adaptive filtering echo elimination method, or a non-linear echo inhibition processing method.

Figure 10:
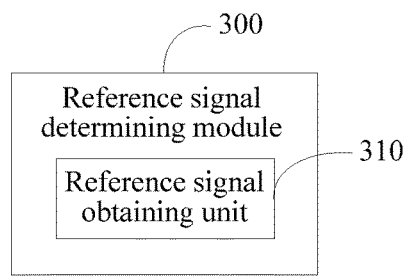
FIG. 10 is a structural block diagram of a reference signal determining module according to an exemplary embodiment.

Optionally, FIG. 10 shows an optional structure of the reference signal determining module 300 provided in an exemplary embodiment. Referring to FIG. 10, the reference signal determining module 300 may include:

a reference signal obtaining unit 310, configured to obtain the reference signal from the audio output device.

Figure 11:
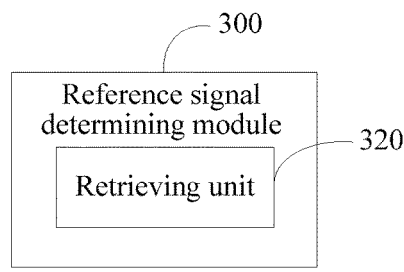
FIG. 11 is another structural block diagram of a reference signal determining module according to an exemplary embodiment.

Optionally, FIG. 11 shows another optional structure of the reference signal determining module 300 provided in an exemplary embodiment. Referring to FIG. 11, the reference signal determining module 300 may include:

a retrieving unit 320, configured to retrieve the reference signal preset.

Figure 12:
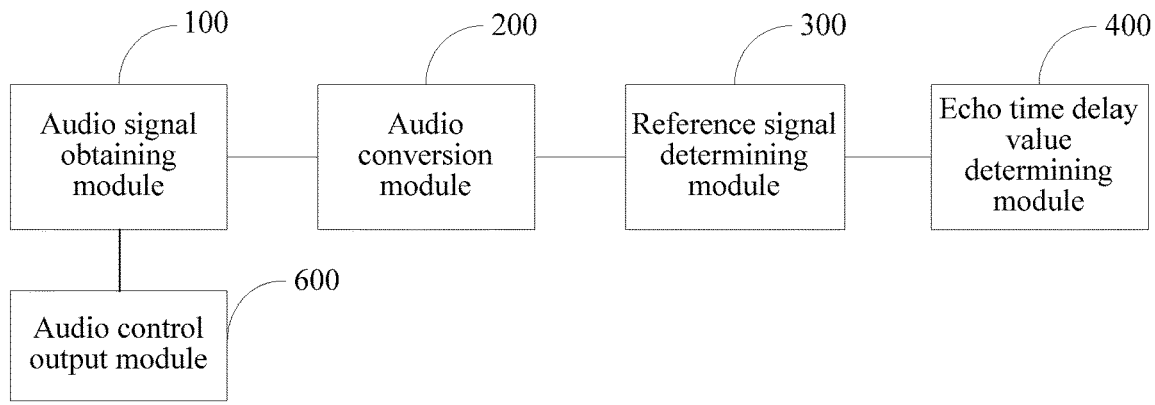
FIG. 12 is still another structural block diagram of an echo elimination chip according to an exemplary embodiment.

Optionally, if the echo elimination chip controls the audio output device to output the audio signal, FIG. 12 shows still another optional structure of the echo elimination chip (or echo elimination device) provided in an exemplary embodiment. In combination with FIG. 8 and FIG. 12, the echo elimination chip may further include:

an audio control output module 600, configured to control the audio output device to output the audio when detecting the call access request.

Optionally, a baseband chip of the terminal equipment may also control the audio output device to output the audio when detecting the call access request.

Figure 13:
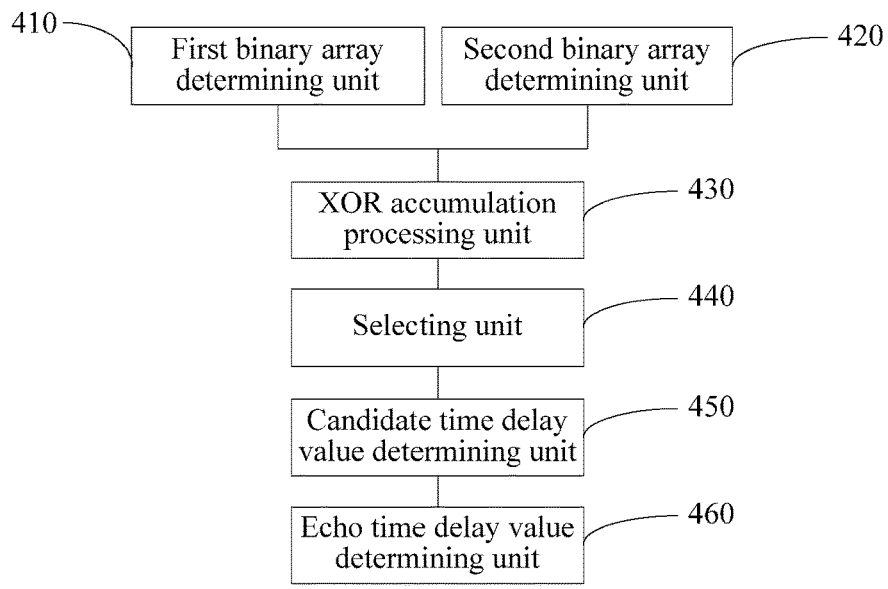
FIG. 13 is a structural block diagram of an echo time delay value determining module according to an exemplary embodiment.

Optionally, the reference signal has a plurality of frames, and the signal to be processed has a plurality of frames. Correspondingly, FIG. 13 shows an optional structure of the echo time delay value determining module 400 provided in an exemplary embodiment. Referring to FIG. 13, the echo time delay value determining module 400 may include:

a first binary array determining unit 410, configured to determine a binary array of each frame of the reference signal, where the binary array of each frame of the reference signal includes binary values of all frequency bins of the frame of the reference signal;

a second binary array determining unit 420, configured to determine a binary array of each frame of the signal to be processed, where the binary array of each frame of the signal to be processed includes binary values of all frequency bins of the frame of the signal to be processed:

an XOR accumulation processing unit 430, configured to perform XOR accumulation processing on the binary arrays of a same frame of the reference signal and the signal to be processed, to obtain an XOR accumulation processing result of each frame;

a selecting unit 440, configured to select a processing result meeting a set requirement from the XOR accumulation processing results of all the frames;

a candidate time delay value determining unit 450, configured to determine a time delay value corresponding to a frame number corresponding to the selected processing result as a candidate time delay value; and an echo time delay value determining unit 460, configured to determine, if the candidate time delay value meets a set convergence condition, the candidate time delay value as the first echo time delay value.

Figure 14:
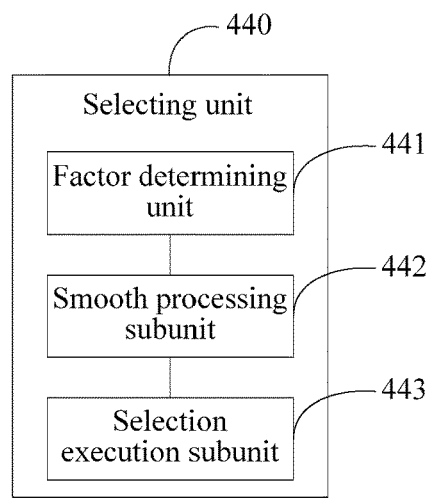
FIG. 14 is a structural block diagram of a selecting unit according to an exemplary embodiment.

Optionally, FIG. 14 shows a selecting unit 440 provided in an exemplary embodiment. Referring to FIG. 14, the selecting unit 440 may include:

a factor determining unit 441, configured to determine a weighting factor corresponding to each frame of the signal to be processed;

a smooth processing subunit 442, configured to perform smooth processing on the XOR accumulation processing result of the corresponding frame according to the weighting factor corresponding to each frame of the signal to be processed, to obtain a smooth XOR accumulation processing result of each frame; and a selection execution subunit 443, configured to select a smooth XOR accumulation processing result meeting a set requirement from the smooth XOR accumulation processing results of all the frames.

Optionally, the factor determining unit 441 is configured to respectively determine a noise level of each frequency bin of each frame of the signal to be processed, respectively determine a Signal-to-Noise-Ratio average of each frame of the signal to be processed according to the noise level of each frequency bin of each frame of the signal to be processed, and respectively determine a weighting factor of each frame of the signal to be processed according to the Signal-to-Noise-Ratio average of each frame of the signal to be processed.

Optionally, make a noise level of a $j^{th}$ frequency bin of each frame of the signal to be processed N(j), where j is an integer in a range of m1 to m2, m1 is obtained by rounding down a calculation result of (M*a)/(fs*c), m2 is obtained by rounding down a calculation result of (M*b)/(fs*c), a is a first set value, b is a second set value, c is a third set value, and fs is an acquisition frequency of the audio signal.

The factor determining unit 441 may specifically be configured to:

for each frame of the signal to be processed, calculate the Signal-to-Noise-Ratio average of each frequency bin according to a formula $$SNR = \sum_{j=m1}^{m2} [Cap(j)/N(j)/(m2-m1)],$$

where SNR is the Signal-to-Noise-Ratio average of one frame of the signal to be processed, and Cap(j) represents a power spectrum of the $j^{th}$ frequency bin of one frame of the signal to be processed; and for each frame of the signal to be processed, determine the weighting factor of each frame of the signal to be processed according to a formula $s=\log_2(SNR/d)$, where s is the weighting factor corresponding to one frame of the signal to be processed, and d is a fourth set value.

Optionally, the first binary array determining unit 410 may specifically be configured to: respectively perform fft of 2M frequency bins on each frame of the reference signal, to obtain an fft processing result of all the frequency bins of each frame of the reference signal, where M is a set value; make j a frequency bin number, and respectively calculate a power spectrum Ref(j) of a $j^{th}$ frequency bin of each frame of the reference signal according to the fft processing result of all the frequency bins of each frame of the reference signal, where j is an integer in a range of m1 to m2, m1 is obtained by rounding down a calculation result of (M*a)/(fs*c), m2 is obtained by rounding down a calculation result of (M*b)/(fs*c), a is a first set value, b is a second set value, c is a third set value, and fs is an acquisition frequency of the reference signal of the audio; respectively calculate a smooth value of the power spectrum Ref(j) of the $j^{th}$ frequency bin of each frame of the reference signal; and for each frame of the reference signal, set a first value for the $j^{th}$ frequency bin if the power spectrum of the $j^{th}$ frequency bin is greater than the smooth value of the power spectrum of the $j^{th}$ frequency bin, or set a second value for the $j^{th}$ frequency bin if the power spectrum of the $j^{th}$ frequency bin is less than or equal to the smooth value of the power spectrum of the $j^{th}$ frequency bin, to obtain binary values corresponding to all the frequency bins, so as to construct a binary array corresponding to each frame of the reference signal.

Optionally, the XOR accumulation processing unit 430 may specifically be configured to: make i a frame number, where i is an integer in a range of 0 to n−1, and n is the total number of frames of the reference signal, and perform XOR accumulation processing on the binary arrays of an $i^{th}$ frame of the reference signal and an $i^{th}$ frame of the signal to be processed according to a formula $$CoxrR(i) = \sum_{j=1}^{m2} [Capb(j) \; Xor \; Refbbur(i)(j)],$$

where

Capb(j) represents a binary value of the $j^{th}$ frequency bin of the $i^{th}$ frame of the signal to be processed, Refbbur (i)(j) represents a binary value of the $j^{th}$ frequency bin of the $i^{th}$ frame of the reference signal. CoxrR(i) represents an XOR accumulation processing result of the $i^{th}$ frame, and Xor represents XOR processing.

Optionally, the echo elimination chip provided in an exemplary embodiment may further include:

a time point recording module (not shown), configured to record an output time pint of each frame of the reference signal and an acquisition time point of each frame of the signal to be processed.

Correspondingly, the candidate time delay value determining unit 450 may specifically be configured to: determine a frame number corresponding to the selected processing result, determine a difference between the acquisition time point of the signal to be processed corresponding to the frame number and the output time point of the reference signal corresponding to the frame number as a time delay value corresponding to the frame number, and determine the time delay value as a candidate time delay value.

Optionally, the selection execution subunit 443 may specifically be configured to select a smooth XOR accumulation processing result having a minimum value from the smooth XOR accumulation processing results of all the frames.

Correspondingly, for the candidate time delay value to meet a set convergence condition may include:

a difference between a maximum value and the minimum value of the smooth XOR accumulation processing results of all the frames is greater than a set difference threshold;

the minimum value of the smooth XOR accumulation processing results of all the frames is less than a set threshold; and the candidate time delay value is kept unchanged for K frames, the K frames include a plurality of successive n frames, and one candidate time delay value is calculated for each n frames.

Optionally, the echo elimination chip further may determine, after detecting the call speech signal, a second echo time delay value according to the audio output by the audio output device and an audio signal obtained according to the output audio and re-acquired by the audio input device, perform next echo elimination by using the second echo time delay value.

Optionally, echo elimination is performed by using a historical echo time delay value if the first echo time delay value meeting the set convergence condition is not determined when the call speech signal is detected.

The historical echo time delay value is an echo time delay value determined at a previous time when the call access request is detected or an echo time delay value determined in a previous call.

The echo elimination chip provided in an exemplary embodiment is capable of determining an echo time delay value and implementing measurement of the echo time delay value by the terminal equipment, thereby providing a basis for accurately performing echo elimination.

The following describes the terminal equipment provided in an exemplary embodiment. As shown in FIG. 1, the structure of the terminal equipment provided in an exemplary embodiment may include: an echo elimination chip, an audio output device, and an audio input device.

The echo elimination chip is configured to: obtain an audio signal transmitted through air and acquired by the audio input device of the terminal equipment when detecting a call access request, the audio signal corresponding to an audio output by the audio output device of the terminal equipment; convert the audio signal to obtain a signal to be processed; determine a reference signal corresponding to the audio signal; and determine an echo time delay value according to the reference signal and the signal to be processed.

The audio output device is configured to output the audio.

The audio input device is configured to acquire the audio signal output by the audio output device and transmitted through air.

It should be noted that an exemplary embodiments in this specification are all described in a progressive manner. Description of each of an exemplary embodiments focuses on differences from other embodiments, and reference may be made to each other for the same or similar parts among respective embodiments. The apparatus embodiments are substantially similar to the method embodiments and therefore are only briefly described, and reference may be made to the method embodiments for the associated part.

Based on the technical solution, the echo time delay detection method provided in an exemplary embodiment includes: obtaining an audio signal transmitted through air and acquired by an audio input device of terminal equipment when detecting a call access request, the audio signal corresponding to an audio output by an audio output device of the terminal equipment; converting the audio signal to obtain a signal to be processed; determining a reference signal corresponding to the audio signal; and determining an echo time delay value according to the reference signal and the signal to be processed. In can be learned that, in an exemplary embodiment, the audio signal transmitted through air and acquired by the audio input device is obtained when the echo elimination chip detects a call access request and the echo time delay value is determined according to the corresponding signal to be processed after converting the obtained audio signal and the reference signal of the audio signal, thereby implementing determining of the echo time delay value at the stage in which the call access request is detected. That is, the echo time delay value is determined before the call, thereby providing a basis for timely and accurately performing echo elimination in the call process.

Persons skilled in the art may further realize that, in combination with exemplary embodiments herein, units and algorithm, steps of each example described can be implemented with electronic hardware, computer software, or the combination thereof. For example, at least one of these components, elements or units described herein may use a direct circuit structure, such as a memory, a processor, a logic circuit, a look-up table, etc. that may execute the respective functions through controls of one or more microprocessors or other control apparatuses. Also, at least one of these components, elements or units may further include or implemented by a processor such as a central processing unit (CPU) that performs the respective functions, a microprocessor, or the like. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. Persons skilled in the art can use different methods to implement the described functions for each particular application, but it should not be considered that the implementation goes beyond the scope of the exemplary embodiments of the disclosure.

In combination with the exemplary embodiments herein, steps of the method or algorithm described may be directly implemented using hardware, a software module executed by a processor, or the combination thereof. The software module may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the technical field.

Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that can be executed by one or more processors. Furthermore, the components, elements or units represented by a block or processing steps may employ any number of related art techniques for electronics configuration, signal processing and/or control, data processing and the like.

The above description of the disclosed embodiments enables persons skilled in the art to implement or use the present disclosure. Various modifications to these embodiments are obvious to persons skilled in the art, the general principles defined in the present disclosure may be implemented in other embodiments without departing from the spirit and scope of the present disclosure. Therefore, the present invention is not limited to these embodiments illustrated in the present disclosure, but needs to conform to the broadest scope consistent with the principles and novel features disclosed in the present disclosure.

What is claimed is:

1. An echo time delay detection method, comprising:
obtaining an audio signal transmitted through air and acquired by an audio input device of terminal equipment when detecting a call access request, the audio signal corresponding to an audio output by an audio output device of the terminal equipment;
converting the audio signal to obtain a signal to be processed;
determining a reference signal corresponding to the audio signal;
determining a binary array, comprising binary values of all frequency bins, of each frame of the reference signal and a binary array, comprising binary values of all frequency bins, of each frame of the signal to be processed; and
determining a first echo time delay value based on binary arrays of respective frames of the reference signal and the signal to be processed,
wherein the determining the binary array of each frame of the reference signal comprises:
respectively performing fast fourier transform (fft) of 2M frequency bins on each frame of the reference signal, to obtain a fft processing result of all frequency bins of each frame of the reference signal, wherein M is a set value;
making j a frequency bin number, and respectively calculating a power spectrum of a $j^{th}$ frequency bin of each frame of the reference signal according to the fft processing result of all frequency bins of each frame of the reference signal; and
for each frame of the reference signal, setting a value for the $j^{th}$ frequency bin in response to the power spectrum of the $j^{th}$ frequency bin, to obtain binary values corresponding to all frequency bins, to construct a binary array corresponding to each frame of the reference signal.

2. The echo time delay detection method according to claim 1, further comprising:
performing echo elimination by using the first echo time delay value at least at an initial stage when detecting a call speech signal.

3. The echo time delay detection method according to claim 2, further comprising:
after detecting the call speech signal, determining a second echo time delay value according to the audio output by the audio output device and an audio signal obtained according to the output audio and re-acquired by the audio input device; and
performing next echo elimination by using the second echo time delay value.

4. The echo time delay detection method according to claim 1, wherein the determining the reference signal corresponding to the audio signal comprises at least one of:
obtaining the reference signal from the audio output device; and
retrieving the reference signal that is preset.

5. The echo time delay detection method according to claim 1, further comprising:
controlling, in response to detecting the call access request, the audio output device to output the audio signal.

6. The echo time delay detection method according to claim 1, wherein the reference signal has a plurality of frames, and the signal to be processed has a plurality of frames, and
wherein the determining the first echo time delay value comprises:
performing XOR accumulation processing on binary arrays of a same frame of the reference signal and the signal to be processed, to obtain an XOR accumulation processing result of each frame;
selecting a process result that meets a set condition from XOR accumulation processing results of all frames of the reference signal and the signal to be processed, determining a time delay value corresponding to a frame number corresponding to the selected processing result, and determining the time delay value as a candidate time delay value; and
determining the candidate time delay value as the first echo time delay value in response to the candidate time delay value meeting a set convergence condition.

7. The echo time delay detection method according to claim 6, wherein the selecting comprises:
determining a weighting factor corresponding to each frame of the signal to be processed;
performing smooth processing on the XOR accumulation processing result of a corresponding frame according to the weighting factor corresponding to each frame of the signal to be processed, to obtain a smooth XOR accumulation processing result of each frame; and
selecting a smooth XOR accumulation processing result that meets the set condition from smooth XOR accumulation processing results of all of the frames.

8. The echo time delay detection method according to claim 7, wherein the determining the weighting factor comprises:
respectively determining a noise level of each frequency bin of each frame of the signal to be processed;
respectively determining a Signal-to-Noise-Ratio average of each frame of the signal to be processed according to noise levels of all frequency bins of each frame of the signal to be processed; and
respectively determining the weighting factor of each frame of the signal to be processed according to the Signal-to-Noise-Ratio average of each frame of the signal to be processed.

9. The echo time delay detection method according to claim 8, wherein the respectively determining the Signal-to-Noise-Ratio average of each frame of the signal to be processed comprises:
making a noise level of a $j^h$ frequency bin of each frame of the signal to be processed N(j), wherein j is an integer in a range of m1 to m2, m1 is obtained by rounding down a calculation result of (M*a)/(fs*c), m2 is obtained by rounding down a calculation result of (M*b)/(fs*c), a is a first set value, b is a second set value, c is a third set value, and fs is an acquisition frequency of the audio signal; and
for each frame of the signal to be processed, calculating the Signal-to-Noise-Ratio average of each frequency bin according to a formula $$SNR = \sum_{j=m1}^{m2} [Cap(j)/N(j)/(m2-m1)],$$

wherein SNR is a Signal-to-Noise-Ratio average of one frame of the signal to be processed, and Cap(j) represents a power spectrum of the $j^{th}$ frequency bin of one frame of the signal to be processed.

10. The echo time delay detection method according to claim 9, wherein the respectively determining the weighting factor comprises:
for each frame of the signal to be processed, determining the weighting factor of each frame of the signal to be processed according to a formula $s=\log_2(SNR/d)$, wherein s is the weighting factor corresponding to one frame of the signal to be processed, and d is a fourth set value.

11. The echo time delay detection method according to claim 7, wherein the selecting the smooth XOR accumulation processing result comprises:
selecting a smooth XOR accumulation processing result having a minimum value from the smooth XOR accumulation processing results of all of the frames, and
the set convergence condition to be met by the candidate time delay value comprises:
a difference between a maximum value and the minimum value of the smooth XOR accumulation processing results of all of the frames is greater than a set difference threshold;
the minimum value of the smooth XOR accumulation processing results of all of the frames is less than a set threshold; and
the candidate time delay value is kept unchanged for K frames, the K frames comprise a plurality of successive n frames, and one candidate time delay value is calculated correspondingly for each n frames, wherein n is a total number of frames of the reference signal.

12. The echo time delay detection method according to claim 6, wherein j is an integer in a range of m1 to m2, m1 is obtained by rounding down a calculation result of (M*a)/(fs*c), m2 is obtained by rounding down a calculation result of (M*b)/(fs*c), a is a first set value, b is a second set value, c is a third set value, and fs is an acquisition frequency of the audio signal.

13. The echo time delay detection method according to claim 6, wherein the performing the XOR accumulation processing comprises:
making i the frame number, wherein i is an integer in a range of 0 to n−1, and n is a total number of frames of the reference signal, and performing the XOR accumulation processing on the binary arrays of an $i^{th}$ frame of the reference signal and an $i^{th}$ frame of the signal to be processed according to a formula $$CoxrR(i) = \sum_{j=1}^{m2} [Capb(j) \; Xor \; Refbbur(i)(j)],$$

wherein

Capb(j) represents a binary value of a $j^{th}$ frequency bin of the $j^{th}$ frame of the signal to be processed, Refbbur(i)(j) represents a binary value of the $j^{th}$ frequency bin of the $i^{th}$ frame of the reference signal, CoxrR(i) represents an XOR accumulation processing result corresponding to the $i^{th}$ frame, Xor represents XOR processing, j is an integer in a range of m1 to m2, m1 is obtained by rounding down a calculation result of (M*a)/(fs*c), m2 is obtained by rounding down a calculation result of (M*b)/(fs*c), a is a first set value, b is a second set value, c is a third set value, and fs is an acquisition frequency of the audio signal.

14. The echo time delay detection method according to claim 6, further comprising:

recording an output time point of each frame of the reference signal and an acquisition time point of each frame of the signal to be processed, and wherein the determining the time delay value corresponding to the frame number corresponding to the selected processing result comprises:

determining the frame number corresponding to the selected processing result; and determining a difference between the acquisition time point of the signal to be processed corresponding to the frame number and the output time point of the reference signal corresponding to the frame number as the time delay value corresponding to the frame number.

15. The echo time delay detection method according to claim 6, further comprising:

performing echo elimination by using a historical echo time delay value in response to the first echo time delay value that meets the set convergence condition being not determined when a call speech signal is detected, wherein the historical echo time delay value is an echo time delay value determined at a previous time when the call access request is detected or an echo time delay value determined in a previous call.

16. The echo time delay detection method according to claim 1, further comprising:

respectively calculating a smooth value of the power spectrum of the $j^{th}$ frequency bin of each frame of the reference signal, wherein the setting the value for the $j^{th}$ frequency bin comprises:

for each frame of the reference signal, setting a first value for the $j^{th}$ frequency bin in response to the power spectrum of the $j^{th}$ frequency bin being greater than the smooth value of the power spectrum of the $j^{th}$ frequency bin, or setting a second value for the $j^{th}$ frequency bin in response to the power spectrum of the $j^{th}$ frequency bin being less than or equal to the smooth value of the power spectrum of the $j^{th}$ frequency bin, to obtain the binary values corresponding to all frequency bins, to construct the binary array corresponding to each frame of the reference signal.

17. An echo elimination device, comprising:

at least one memory operable to store program code; and at least one processor operable to read the program code, and operate as instructed by the program code, the program code comprising:

obtaining code configured to cause the at least one processor to obtain an audio signal transmitted through air and acquired by an audio input device of terminal equipment when detecting a call access request, the audio signal corresponding to an audio output by an audio output device of the terminal equipment;

conversion code configured to cause the at least one processor to convert the audio signal to obtain a signal to be processed;

first determination code configured to cause the at least one processor to determine a reference signal corresponding to the audio signal;

second determination code configured to cause the at least one processor to determine a binary array, comprising binary values of all frequency bins, of each frame of the reference signal and a binary array, comprising binary values of all frequency bins, of each frame of the signal to be processed; and third determination code configured to cause the at least one processor to determine a first echo time delay value based on binary arrays of respective frames of the reference signal and the signal to be processed, wherein the second determination code causes the at least one processor to determine the binary array of each frame of the reference signal by:

respectively performing fast fourier transform (fft) of 2M frequency bins on each frame of the reference signal, to obtain a fft processing result of all frequency bins of each frame of the reference signal, wherein M is a set value;

making j a frequency bin number, and respectively calculating a power spectrum of a $j^{th}$ frequency bin of each frame of the reference signal according to the fft processing result of all frequency bins of each frame of the reference signal; and for each frame of the reference signal, setting a value for the $j^{th}$ frequency bin in response to the power spectrum of the $j^{th}$ frequency bin, to obtain binary values corresponding to all frequency bins, to construct a binary array corresponding to each frame of the reference signal.

18. The echo elimination device according to claim 17, wherein the program code further comprises at least one of:

second obtaining code configured to cause the at least one processor to obtain the reference signal from the audio output device; and retrieval code configured to cause the at least one processor to retrieve the reference signal that is preset.

19. The echo elimination device according to claim 17, wherein the third determination code causes the at least one processor to:

perform XOR accumulation processing on binary arrays of a same frame of the reference signal and the signal to be processed, to obtain an XOR accumulation processing result of each frame;

select a processing result meeting a set condition from XOR accumulation processing results of all frames of the reference signal and the signal to be processed;

determine a time delay value corresponding to a frame number corresponding to the selected processing result as a candidate time delay value; and determine, in response to the candidate time delay value meeting a set convergence condition, the candidate time delay value as the first echo time delay value.

20. Terminal equipment, comprising the audio output device, the audio input device, and the echo elimination device according to claim 17, the audio output device being configured to output the audio; and the audio input device being configured to acquire the audio signal corresponding to the audio output by the audio output device and transmitted through the air.

21. A non-transitory computer-readable storage medium having stored therein a computer readable code executable by a processor to perform:
- obtaining an audio signal transmitted through air and acquired by an audio input device of terminal equipment when detecting a call access request, the audio signal corresponding to an audio output by an audio output device of the terminal equipment;
- converting the audio signal to obtain a signal to be processed;
- determining a reference signal corresponding to the audio signal;
- determining a binary array, comprising binary values of all frequency bins, of each frame of the reference signal and a binary array, comprising binary values of all frequency bins, of each frame of the signal to be processed; and
- determining a first echo time delay value based on binary arrays of respective frames of the reference signal and the signal to be processed, wherein the determining the binary array of each frame of the reference signal comprises:
- respectively performing fast fourier transform (fft) of 2M frequency bins on each frame of the reference signal, to obtain a fft processing result of all frequency bins of each frame of the reference signal, wherein M is a set value;
- making j a frequency bin number, and respectively calculating a power spectrum of a $j^{th}$ frequency bin of each frame of the reference signal according to the fft processing result of all frequency bins of each frame of the reference signal; and
- for each frame of the reference signal, setting a value for the $j^{th}$ frequency bin in response to the power spectrum of the $j^{th}$ frequency bin, to obtain binary values corresponding to all frequency bins, to construct a binary array corresponding to each frame of the reference signal.

* * * * *